Sept. 11, 1956 N. C. PRICE 2,762,584
VERTICALLY RISING ROAD OPERABLE AIRCRAFT
Filed Aug. 15, 1952 4 Sheets-Sheet 3
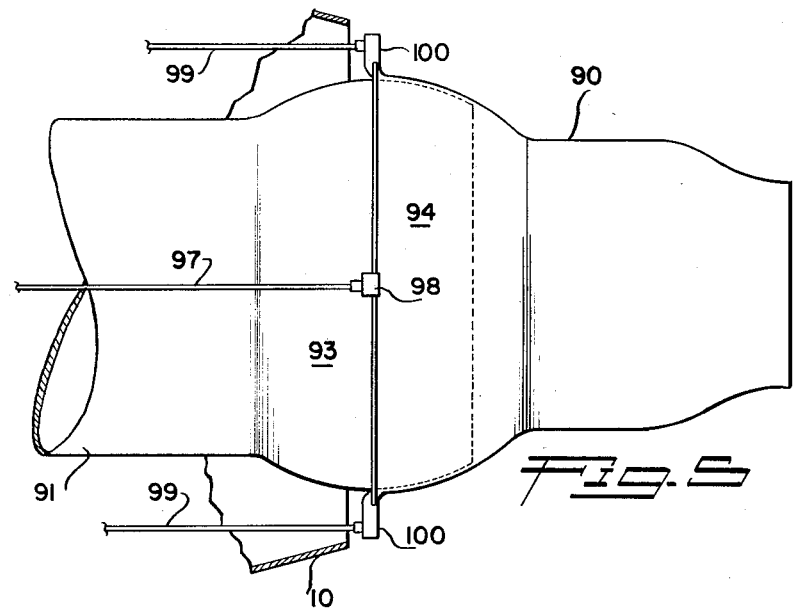
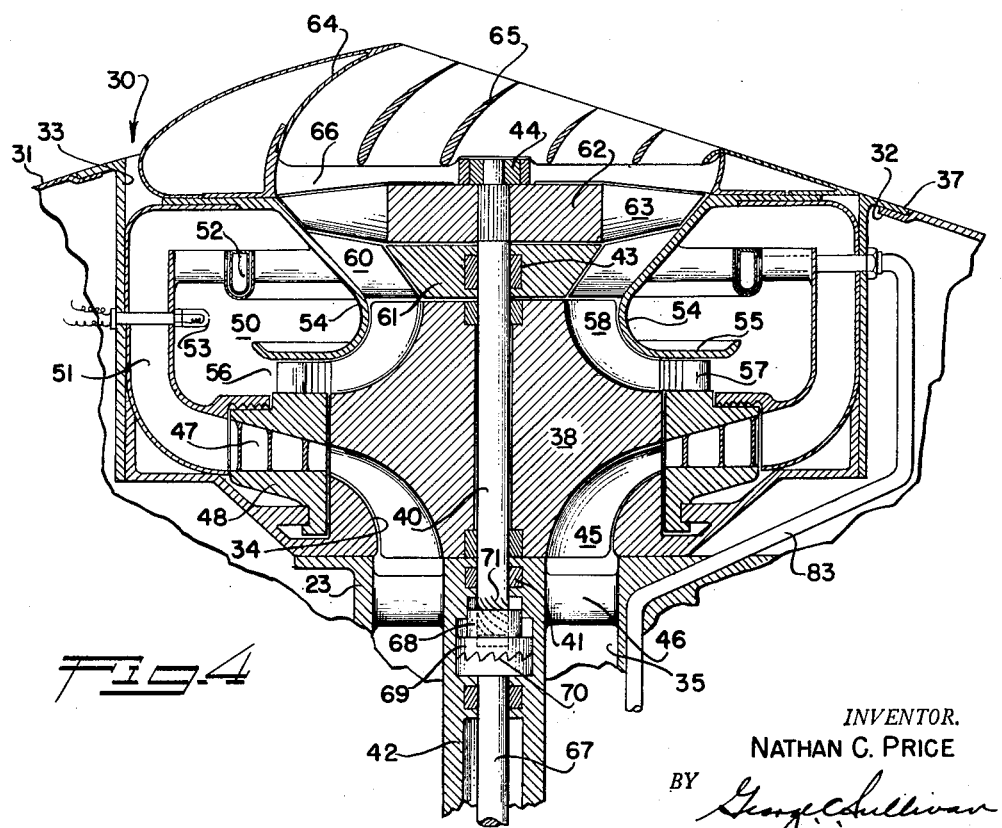
INVENTOR.
NATHAN C. PRICE
BY
Agent

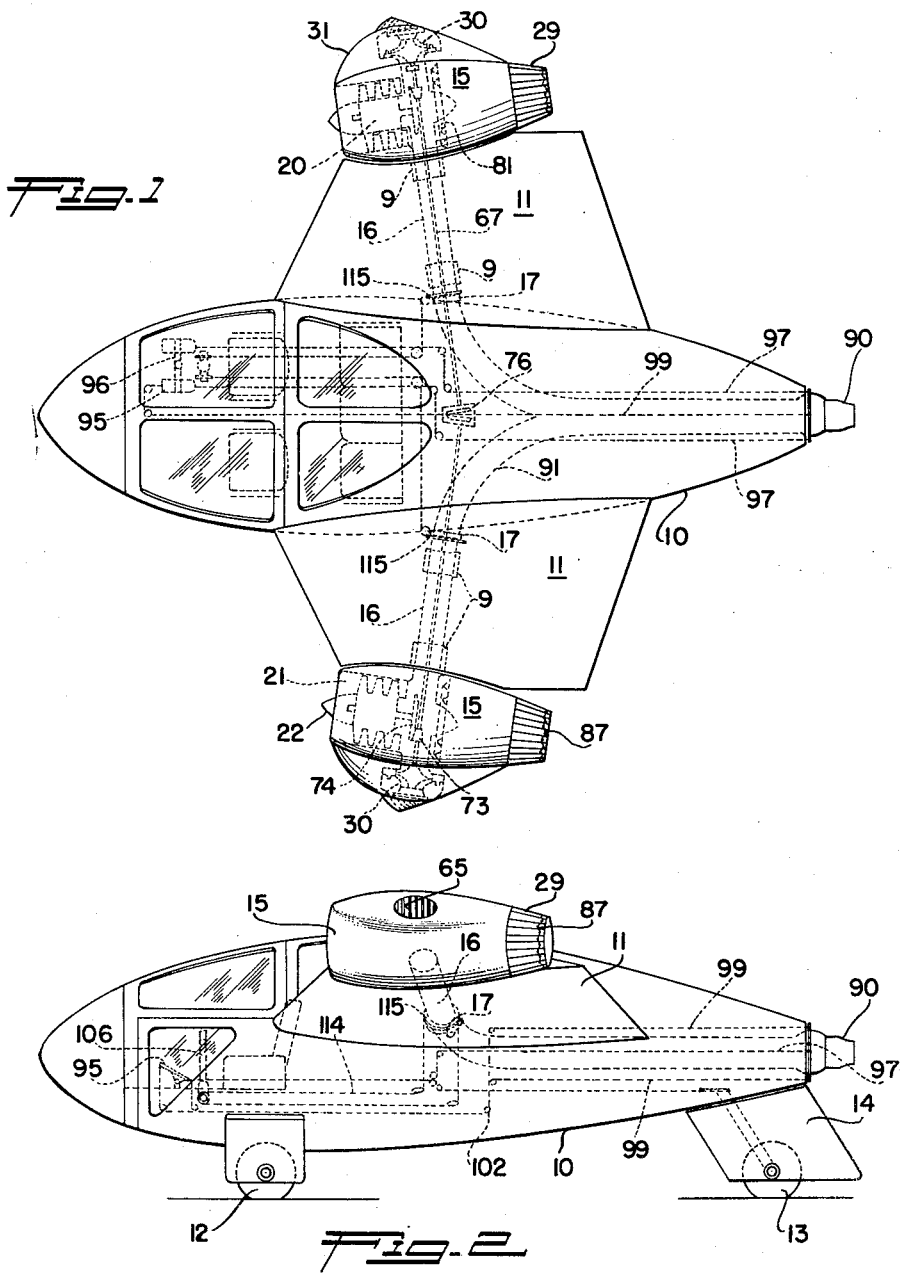

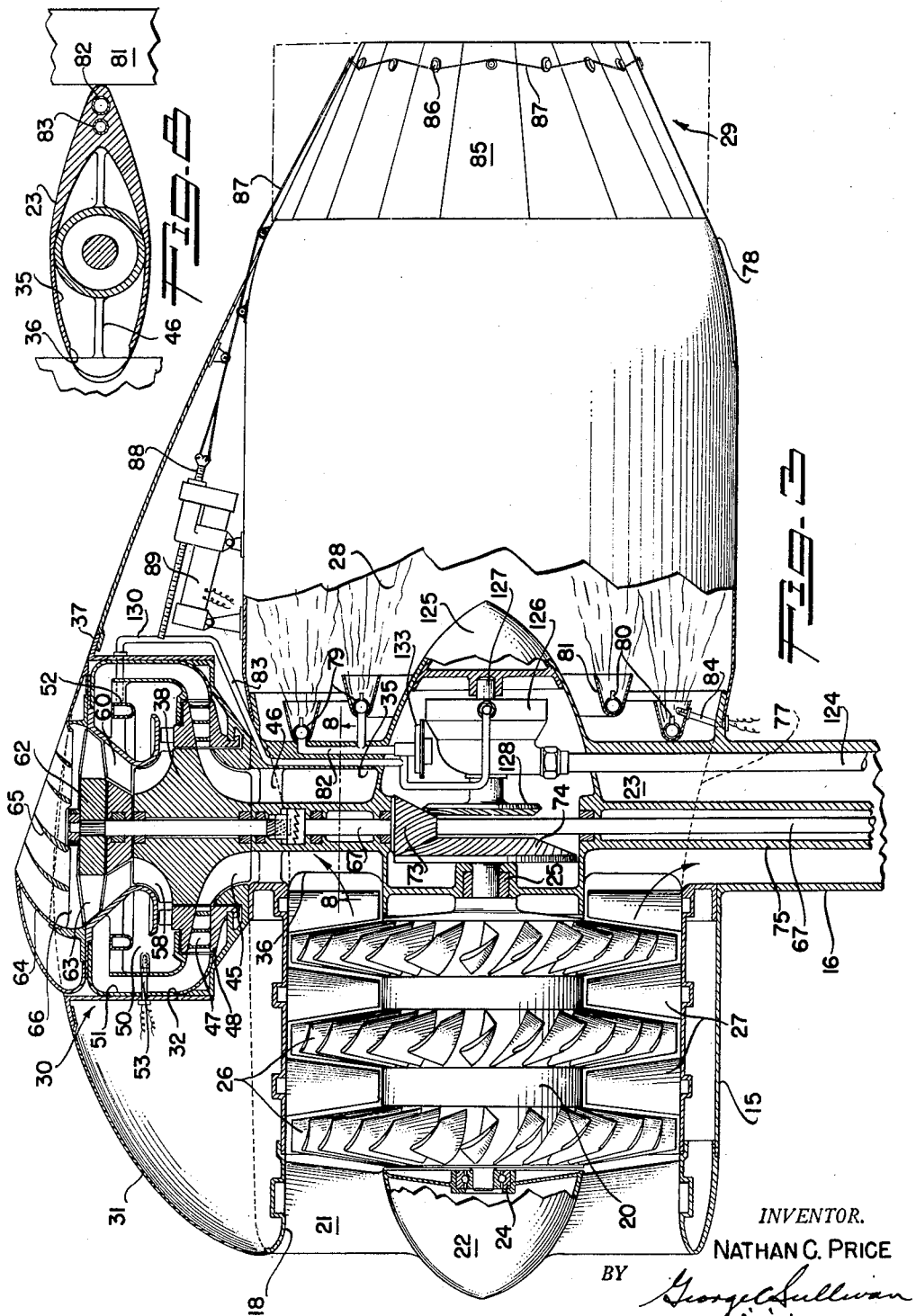

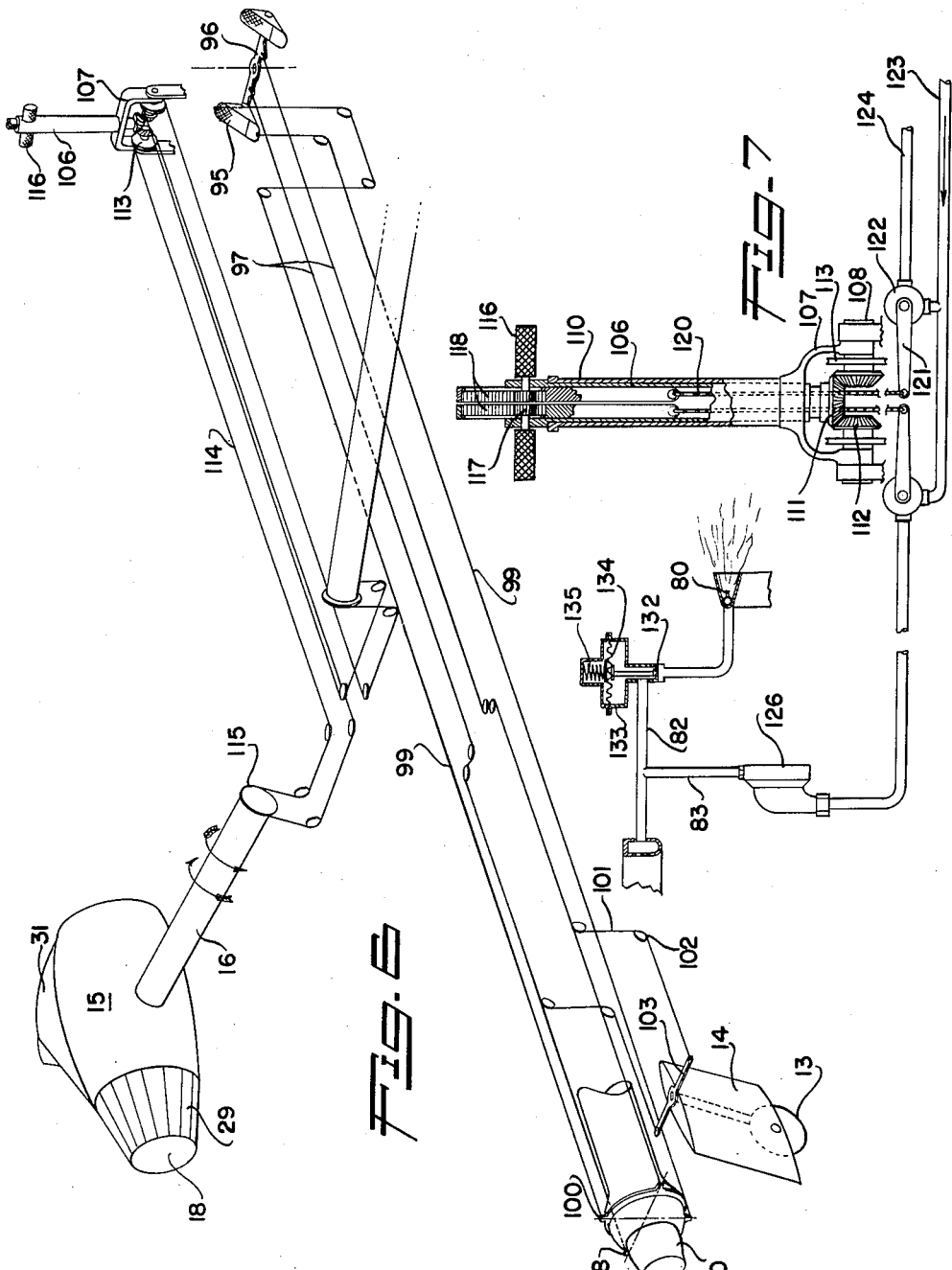

United States Patent Office 2,762,584
Patented Sept. 11, 1956

2,762,584

VERTICALLY RISING ROAD OPERABLE AIRCRAFT

Nathan C. Price, Hollywood, Calif., assignor to Lockheed Aircraft Corporation, Burbank, Calif.

Application August 15, 1952, Serial No. 304,623

17 Claims. (Cl. 244—12)

This invention relates to airplanes capable of vertical and substantially vertical ascent and descent during takeoff and landing operations, capable of horizontal flight, and orthodox maneuvers while in flight, and also capable of operation along roads and other surfaces in much the same manner as automobiles and other ground vehicles. It is a general object of this invention to provide a vehicle or airplane of this character that is compact and therefore well adapted for travel on roads and highways without the detachment or folding of its wings, that has a long range and relatively high cruising speed when in flight and that is safe to operate both in flight and on the road.

Another object of the invention is to provide an airplane characterized by novel propulsive means imparting long range and high cruising speed characteristics to the aircraft. The propulsion means comprises reactive turbo jet engines compounded with ducted compressors to have high power values and high jetting velocities from their propulsive nozzles. The turbo engines draw or receive air under compression from the ducted compressors to be, in effect, supercharged so as to produce maximum power. The ducted compressors, which are preferably multi-stage compressors or compressors with blading of high turning angle to operate with low tip speed, in turn receive rammed air and the major proportion of the compressed air exhausted or discharged by these compressors flows through after-burners for ejection through variable area propulsive nozzles, the afterburners being operable to increase or boost the propulsive effect of the compressed air jets when additional propulsive thrust is required. The propulsion means, each comprising the turbo jet engine and the ducted propulsive compressor with its afterburner, are compact powerful propulsion units capable of supplying ample power for the propulsion and operation of the airplane in the manners mentioned above.

Another object of the invention is to provide an airplane of the type referred to wherein the propulsive powerplants are located and arranged to insure maximum safety to the airplane structure and its occupants. The gas turbines are so positioned that no part of the airframe structure is within the planes of the high velocity high temperature rotors. The explosion of either gas turbine rotor will not damage the airframe or cause failure of either ducted compressor and the compressors will continue to operate after such an explosion. Furthermore, the airframe is effectively isolated from any fire that may start by reason of powerplant failure. Although portions of the aircraft may be within the planes occupied by the ducted compressors these compressors are designed purposely to operate at relatively low tip speeds so that there is practically no danger of the compressor rotors exploding.

Another object of the invention is to provide an aircraft of this character wherein the turbo jet engines are positioned and arranged to be readily accessible for inspection, servicing and replacement. The ducted compressors are mounted at the wing tips and the turbo jet engines are arranged on the outboard sides of the compressors where they are readily accessible. Furthermore, the shafts and axes of the turbo engines extend spanwise with respect to the wings and at substantially right angles to the axis of rotation of their related compressors so that the entire turbo engines may be easily moved axially or spanwise for removal from and insertion into their operative positions in the pods or nacelles containing the ducted compressors.

Another object of the invention is to provide an aircraft of the kind described in which the turbo jet-ducted compressor powerplants are swivelly or rotatably mounted on the wing tips so as to be movable to positions to effect vertical ascent during takeoff, vertical descent during landing, to control the direction of flight during air maneuvering and cruising, to control the forward direction of travel during ground maneuvers, and to reverse the direction of travel or back up when on the ground.

A further object of the invention is to provide an aircraft of the kind described incorporating a novel directional and stabilizing control or trimming system. In the aircraft of the invention a portion of the air compressed by the ducted compressors is led to a directional control nozzle provided on the empennage or aft portion of the craft. This nozzle is supported for universal movement and is adapted to be moved and controlled to direct its jet of compressed air in any direction desired to provide a trimming action particularly during vertical ascent and descent. In addition, there is a rudder at the under side of the empennage carrying the rear landing wheel and movable with the directional trimming nozzle when the same is moved in the lateral or horizontal directions. This assists in the directional control of the craft during ground maneuvers as well as during flight. The variable angle ducted compressor-gas turbine nacelles or pods provided on the wing tips make it possible to employ wings of very short span and low aspect ratio, particularly if the wings are given a large upsweep. Thus the mounting of the powerplant pods on the wing tips for angular or swivelling movement makes it possible to construct a small compact airplane adapted to be stored in a relatively small building, such as a double garage, and adapted to be driven or taxied on an automobile road. By directing the powerplant pods to discharge their air and gas jets slightly upward there are no hazardous high velocity streams of air or gas discharged at the road or ground level.

Other objectives and features of the invention will become apparent from the following detailed description throughout which reference will be made to the accompanying drawings wherein:

Figure 1 is a plan view of an aircraft of the invention;

Figure 2 is a side view of the aircraft;

Figure 3 is an enlarged substantially horizontal detailed sectional view of one of the powerplant installations with the afterburner and nozzle portions appearing in elevation;

Figure 4 is an enlarged substantially horizontal detailed sectional view of the gas turbine unit of the powerplant installation;

Figure 5 is a plan or elevation view of the aft trimming nozzle;

Figure 6 is a diagrammatic view illustrating the several controls of the invention;

Figure 7 is an enlarged front view of the control stick portion of the control system with a portion appearing in vertical cross section and illustrating parts of the fuel system in a diagrammatic manner; and Figure 8 is an enlarged transverse sectional view taken substantially as indicated by line 8—8 on Figure 3.

The airframe or body of the aircraft includes a fuselage 10 and short span wings 11 extending therefrom. The major forward portion of the fuselage 10 is the pilot and passenger compartment. The wings 11, which may preferably have a low aspect ratio, have a substantial upsweep. The fuselage 10 is provided with forward landing wheels 12 constructed and arranged to fold under the pilot compartment and a rear landing wheel 13 is associated with a rudder 14 projecting downwardly from the aft portion of the fuselage. The rudder 14 is arranged to turn about a generally upright axis and the wheel 13 moves with the rudder to assist in guiding or directing the craft on the ground.

The propulsion means of the aircraft are housed and carried in pods 15 at the tips of the wings 11. The pods 15 are, in turn, supported on tubular shafts 16 appropriately rotatably mounted in spaced bearings 9 in the wings 11. The shafts 16 in addition to carrying the pods 15 for angular adjustment or movement relative to the wings 11 serve to conduct compressed air and their inner ends have swivel joints 17 which may assist in supporting the shafts. As shown in Figures 1 and 2 the shafts 16 incline upwardly and forwardly relative to the longitudinal axis of the fuselage 10 and the pods 15 which are fixed on the outer ends of the shafts are thus supported to turn about these axes. Each pod 15 has a main air duct 18 extending through it. These ducts 18 are relatively large in diameter and their forward ends are open for the reception of rammed air during forward flight, etc.

Each powerplant unit has a ducted compressor including a rotor 20 operating in a duct 18. Spaced guide vanes 21 in the forward ends of the ducts 18 carry stationary hubs 22 and two diametrically opposite streamlined webs 23 extend into each duct 18 in alignment or concentric relation to the related shaft 16. Stub shafts on the forward and aft ends of the compressor rotors 20 are journaled in bearings 24 and 25 on the hubs 22 and webs 23 respectively. The rotors 20 carry spaced rows of blades 26 which operate between rows of stator blades 27 projecting inwardly from the walls of the ducts 18. The portions of the ducts 18 aft of the compressors and webs 23 are somewhat enlarged in diameter and constitute combustion chambers or afterburner chambers 28. The rear portions of these combustion chambers 28 converge to variable area nozzles 29 which will be described later in more detail.

Each propulsion unit further includes a gas turbine 30 for driving the related ducted compressor. The outer sides of the pods 15 have enlargements or fairings 31 for housing or containing the gas turbines 30. These fairings 31 are streamlined and each has a substantially cylindrical pocket 32 in its outer side substantially coaxial with the related shaft 16. The pockets 32 receive and contain gas turbine housings 33. The housings 33 have inlet passages 34 at their inner ends. These passages 34 communicate with passages 35 in the webs 23 and the webs have openings 36 in their forward sides open to the ducts 18 to receive compressed air from the compressors. Thus, air under compression from the ducts 18 is supplied to the air inlet passages 34 of the turbo jet gas engines 30. The gas turbine engines 30 are removable from the fairings 31 and their housings 33 may have marginal flanges 37 removably secured to the fairing by screws, or the like.

The gas turbine engines include compressor-turbine rotors 38 freely rotatable on shafts 40. The shafts 40 are coaxial with the abovementioned shafts 16 and have their inner ends carried in bearings 41 in what I will term shaft tunnels 42. The outer portions of the shafts 40 are carried in spaced bearings 43 and 44. The rotors 38 and the walls of the inlet passages 34 are shaped and related to define or leave annular compression chambers which curve axially and radially outward and which gradually diminish in capacity in the outward direction. Impeller or compressor vanes 45 are provided on the rotors 38 to operate in the annular compressor chambers. The vanes 45 extend from the ends or hubs of the rotors 38 to their peripheries which are of substantially increased diameter intermediate their ends. The abovementioned webs 23 have guide vanes 46 adjacent the entrances to the openings 34 and these vanes may assist in supporting the shaft tunnels 42. In addition to the compressor vanes 45, there are counter-rotating diffuser vanes 47 at the peripheries of the rotor 38. These diffuser vanes 47 are carried by rings 48 adapted to rotate in the opposite direction to the rotors 38. The vanes 47 are in annular flaring or divergent passages leading radially through the rings 48. It will be seen that air received by the ducts 18 during flight is compressed by the ram effect and is further compressed by the compressor blading 26 and that some of this compressed air passes through the openings 36 and passages 35 to be further compressed by the blading 45 and 47. Thus the compressors of the turbo jet engines 30 are compounded with the ducted compressors of the ducts 18.

The turbo jet engines 30 further include annular combustion chambers 50 which receive the compressed air from the compounded compressor systems, just described. Annular passages 51 lead from the peripheries of the counter-rotating rings 48 to the outer or aft ends of the chambers 50. In addition to conducting the compressed air to the outer ends of the chambers 50, the passages 51 form insulating air spaces separating the combustion chambers from the casings 33 of the turbo jet engines. Fuel injecting rings 52 are provided in the combustion chambers 50 and suitable electrical ignitors 53 extend into the combustion chambers to initiate combustion of the fuel and air mixture. Annular walls 54, which are spaced around the rotors 38, form the inner boundaries of the combustion chambers 50. These walls 54 have portions 55 lying in generally radial planes and the walls curve and flare outwardly from these radial portions. The wall portions 55 are spaced from the outer sides of the enlarged intermediate parts of the rotors 38 to leave annular turbine entrance passages 56. Rows of reaction type turbine blades 57 project axially from the rings 48 to extend into these passages 56. The compressed air and gases of combustion discharging from the chambers 50 through the passages 56 act on the buckets or blades 57 to drive or rotate the rings 48. The rear or aft portions of the rotors 38 are curved and the walls 54 are spaced therefrom to leave expansion passages. The curved aft portions of the rotors 38 carry turbine blades 58 which may be of the Francis type and the expanding gases upon leaving the blades 57 of the rings 48 act on these blades 58 to drive the rotors in a direction counter to the rings 48. Rows of stator or guide vanes 60 are arranged downstream from the blades 58 and serve to support central bosses 61 which carry the abovementioned shaft bearings 43. Power turbine wheels 62 are fixed or splined on the shafts 40 beyond the bosses 61 and carry rows of turbine buckets or blades 63. The discharging and expanding gases and compressed air upon leaving the blades 60 act on the blades 63 to drive the power turbine rotors 62.

The invention utilizes the high velocity gases discharging from the turbo jet engines 30 to provide additional propulsive thrust. Nozzles or discharge fittings 64 are provided on the aft or outer ends of the engine casings 33 and have series of spaced curved guide vanes 65. These vanes 65 are designed and arranged to direct the discharging gases laterally and rearwardly from the outer sides of the pods 31 to provide reactive thrust which assists in propelling the aircraft. Webs 66 at the inner edges of the airfoil shaped guide vanes 65 carry the abovementioned shaft bearings 44.

The power turbines 62 of the turbo jet engines just described provide the power for driving the ducted compressors 20. The abovementioned shafts 40 of the rotors 62 extend into the outer ends of the tunnels 42 and are connected with relatively short shafts 67 through the medium of overrunning clutches. Any suitable or selected form of overrunning clutches may be employed. In the particular case illustrated the clutches include spiral splines 71 on the ends of the shafts 40 mating with similar splines within the hubs 68. The members 69 and the opposing ends of the shafts 67 have cooperable clutch teeth 70. So long as the related turbine 62 is driving its shaft 67 the spiral splines 71 maintain the teeth 70 in cooperation for the transmission of the rotation. However, if the shafts 67 rotate faster than the related shaft 40, the splines 71 cause the member 69 to back off or move axially to allow release of the teeth 70. Thus the shaft 67 may overrun the normal driving shaft 40. When the shaft 40 again assumes a driving role, the splines 71 feed the teeth 70 back into meshing cooperation for the transmission of power from the driving turbine to the ducted compressor.

The drives or driving connections between the turbines 62 and the ducted compressors 20 further include spiral beveled pinions 73 on the shafts 67 meshing with spiral beveled gears 74 on the aft ends of the compressor rotors 20. It will be seen that the turbines 62 normally drive the related ducted compressors. The shafts 67 continue inwardly through tubular tunnels 75 to adjacent the fore and aft axis of the fuselage 10 where they are operatively connected by a universal joint or appropriate gearing 76. With this geared connection of the shafts 67 and the overrunning clutches above described, the ducted compressors 20 may normally be driven by their respective turbo jet engines 30 and if either engine fails or is shut down for any reason the other engine will drive both ducted compressors. In the latter case the compressors 20 may not operate at full or normal speed but their operation will be sufficient to sustain flight of the aircraft.

The multi-stage ducted compressors 20 operated or driven as just described supply or pass substantial volumes of high velocity air under pressure through the afterburners or combustion chambers 28 for discharge from the nozzles 29 to produce the primary propulsive streams or jets. The chambers or afterburners 28 are in the nature of rearward extensions of the ducts 18 although they are preferably somewhat larger in diameter than the ducts. As shown at 77, the walls of the chambers 28 flare rearwardly from the aft ends of the compressors 20 to beyond the webs 28. The major walls of the chambers 28 may be cylindrical and their aft portions 78 are convergent to form the entrances of the propulsive nozzles 29. Spaced concentric fuel rings 79 are mounted at the rear of the webs 23 and have circumferentially spaced fuel injecting jets or nozzles 80. Rearwardly flaring annular channels or rings 81 engage around the fuel rings 79 and jets 80 to protect the jets against the high velocity air streams and to assure an efficient distribution of the fuel and, therefore, an effective and efficient combustion of the fuel in the compressed air stream. The pipes or tubes 82 for supplying fuel to the fuel rings 79 may extend radially through the webs 23 and similar tubes 83 may extend through the webs to the fairings 31 and thence to the fuel injecting rings 52 of the turbo jet engines 30. The control system for the fuel ducts or tubes 82 and 83 will be later described. Electrical ignitors 84 are provided at the rings 81 to ignite the fuel discharging from the nozzles 80.

In accordance with the broader aspects of the invention any appropriate form of propulsive nozzles may be employed on the aft ends of the passages or chambers 28 of the ducts 18. It is preferred to employ variable area nozzles that are such that their effective cross sectional areas may be increased when fuel is supplied to the jets 80 of the afterburners 28 and that may be reduced in effective area when afterburning is reduced or terminated. In the drawings I have shown nozzles 29 of the kind described and claimed in my copending application Serial Number 252,147, filed October 19, 1951. These nozzles 29 comprise series of overlapping strips 85 of metal secured to the ends 78 of the chambers 28 and arranged to define nozzle passages. Small pulleys 86 are mounted on the strips 85 adjacent their rear ends and "draw strings" or cables 87 are lead past opposite sides of alternate pulleys and thence to screw jacks 88. The screw jacks 88 are housed in the rear portions of the fairings 31 and are operated by reversible electric motors 89. Upon actuation of the motors 89 in one direction the cables 87 are tightened on the flexible strips 85 to draw them into positions such as shown in full lines in Figure 3. This reduces the cross sectional areas of the nozzles 29 and adapts them for the discharge of efficient high velocity propulsive streams or jets when no fuel is supplied to the afterburners 28. Upon operating the motors 89 in the other direction the cables 87 are relaxed so that the internal gas pressure acting on the strips 85 moves or flexes the strips to positions such as shown in broken lines in Figure 3. This conditions the nozzles 29 for the most efficient discharge of the propulsive jets when the afterburners 28 are in operation.

The invention provides a directional control nozzle 90 useful in trimming the aircraft particularly during vertical ascent and descent. This nozzle 90 is at the aft end of the fuselage 10 and is supplied with compressed air from the ducted compressors 20. The above-mentioned tubular shafts 16, which carry the pods 15 for angular movement, form ducts for bleeding off or conducting away some of the compressed air from the ducts 18. The tubular shafts 16 have communication with the interiors of the webs 26 which, in turn, have openings 36 for receiving compressed air from the ducts 18. The inner ends of the shafts 16 are connected with a Y or U-shaped duct 91 by the suitable universal or swivel joints 17 and the duct 91 extends rearwardly through the aft portion of the fuselage 10 to the nozzle 90.

The directional trimming control nozzle 90 is supported for universal movement so that the direction of its jet may be changed or controlled at will. As best illustrated in Figure 5, the aft end of the compressed air duct 91 has a spherically curved enlargement 93. The directional air nozzle 90 is a tubular member having a partially spherical forward portion 94 engaging about and freely movable on the spherical portion 93 of the duct 91. The engagement of the nozzle portion 94 on the duct portion 93 is such that the nozzle 90 is positively restrained against rearward displacement from the duct 91 and yet is free to swivel and move in various angular directions. The rear or aft end part of the nozzle 90 converges to discharge the compressed air stream in the form of a reactive jet capable of exerting considerable directional or trimming control on the aircraft.

The means for moving or controlling the nozzle 90 may include a pair of pedals 95 carried on the ends of a pivoted lever 96, see Figure 6. The lever 96 is mounted to pivot about a vertical axis so that its ends may be moved fore and aft by foot pressure on the pedals 95 and the pedals, or at least one of them, is supported on the lever 96 to pivot about a horizontal axis to be moved or pivoted up and down by the pilot. Cables 97 are attached to the lever 96 at opposite sides of its pivotal axis and extend aft through the fuselage 10 for connection with lugs 98 at opposite sides of the nozzle portion 94. Similar cables 99 are attached to the upper and lower ends of the pivoted pedal 95 and extend aft through the fuselage 10 to the nozzle 90 where they are attached to lugs 100 on the upper and lower sides of the nozzle portion 94. It will be seen that by manipulating the pedals 95 to pivot the lever 96, the nozzle 90 may be swung or directed horizontally to the right or to the left, by pivoting the pedal 95 the nozzle 90 may be swiveled or swung vertically upward or downward, and by manipulating both the lever and pedal simultaneously the nozzle may be moved or swung in any intermediate position or direction.

The above described rudder 14 and the rear landing wheel 13 are preferably connected with the control system for the nozzle 90 to be moved simultaneously therewith when the nozzle is swung horizontally to the right or to the left. Cables 101 are connected with the cables 97 and extend over direction changing pulleys 102 to a horn or lever 103 on the rudder 14. This arrangement is such that the rudder 14 carrying the aft landing wheel 13 moves in unison with the nozzle 90 when the nozzle is swung right or left and thus assists in directing the flight of the aircraft and in trimming the aircraft, particularly during vertical and substantially vertical ascent and descent.

The invention provides a simple unitary control means for the turbo jet powerplants 30, the afterburners 28 and the movable pods 15. This control includes a pilot's control column 106 provided at its lower end with a yoke 107 journaled on horizontal pins 108. With this mounting the column 106 may be hinged or swung fore and aft about a horizontal axis. An inner tube 110 is rotatable in the column 106 and a bevel pinion 111 is fixed on its lower end. The pinion 111 meshes with a pair of spaced opposed gears 112 fixed on the pins 108. It will be seen that fore and aft movement of the column 106 produces equal movements of the gears 112 in the same direction while rotation of the inner tube 110 produces equal but opposite motions of the gears 112. Both of these control movements can be combined to cause a motion of one gear 112 greater than the other and in the same or opposite direction. Pulleys 113 are fixed on the shafts or pins 108 and endless cables 114 are engaged over the pulleys, see Figure 6. The cables 114 extend through the fuselage 10 and wings 11 to pulleys 115 fixed on the tubular shafts 16 which carry the pods 15. This control system is such that movements of the gears 112 produced by motion of the column 106 and tube 110 cause corresponding movements of the pods 15 carrying the propulsive nozzles 29 and 64. The upper end of the control column tube 110 has a pair of projecting handles 116 which may be employed to move the column 106 and to turn the tube 110.

The turbo jet powerplants 30 and the afterburners 28 are controlled by the handles 116; that is, the delivery of fuel to the powerplants and afterburners is governed by rotation of the handles. The handles are independently journaled in transverse openings in the upper portion of the tube 110 and carry pinions 117 which mesh with separate racks 118 slidable longitudinally in the tube. Bowden wires 120 operatively connect the racks 118 with the levers 121 of fuel valves 122. The valves 122 are connected between a fuel supply pipe 123 leading from a suitable source of fuel, not shown, and separate fuel lines 124 leading through the fuselage 10 and wings 11. The fuel lines 124 pass through openings or glands in the walls of the Y ducts 91 and continue through the tubular shafts 16 to the above described webs 23. The rear sides of the webs 23 have streamlined hollow bosses 125 which house fuel pumps 126 and fuel lines 124 extend to the intake or low pressure sides of the pumps. The pumps 126 are preferably driven by the turbo powerplants 30 and the pump shafts 127 carry bevel gears 128 which mesh with the above described pinions 73 on the engine driven shafts 67. The abovementioned pipes 83 extend from the high pressure sides of the pumps 126 to the fuel rings 52 of the powerplants 30. The pipes 83 have the branches 82 leading to the fuel rings 79 of the afterburners 28. Needle valves 132 are interposed in the branch fuel lines 82 to control the admission or delivery of fuel to the afterburner nozzles 80. The needle valves 132 face downstream to be urged toward the closed position by the fuel under pressure. Pressure chambers 133 have communication with the branch lines 82 at the upstream sides of the valves 132 and flexible diaphragms 134 extend across the chambers. The needle valves 132 are connected with the diaphragms 134 to be moved to the open positions when the diaphragms are flexed outwardly by the fuel under pressure. Springs 135 resist outward flexure of the diaphragms and bias the valves 132 toward the closed positions. The springs 135 and the fuel pressure acting on the valves 132 hold the valves closed until and unless the turbo jet powerplants 30 are operated at a sufficiently high speed to drive the fuel pumps 126 at a speed sufficiently high to develop fuel pressure in the lines 131 great enough to flex the diaphragms 134 outwardly and unseat the valves. Upon opening of the valves 132 fuel under pressure is supplied to the afterburners 28. Thus additional propulsive thrust is automatically provided when the turbo powerplants 30 drive the ducted compressors 20 at the higher speeds. In this connection it is to be observed that the above described handles 116 are separately or independently operable so that the turbo powerplants 30 and ducted compressors 20 of the two pods may be independently controlled to produce differential thrust at the wing tip pods. For example, one handle 116 may be operated to cause high speed operation of the powerplant 30 of its related pod 15 and accompanying high speed operation of the related compressor 30 with accompanying operation of the afterburner 28, while the other handle 116 may be controlled to provide for relatively low speed or low load operation of its respective powerplant 30 so that the afterburner 28 of the other pod 15 remains idle. The exhaust thrust from the power turbine 62 of the unloaded turbo jet engine 30 will also be comparatively low under these circumstances.

The vehicle or aircraft of the invention is capable of operation in various manners, being extremely versatile in its applications. It is capable of vertical or substantially vertical ascent from the field, the ground or shipboard. To accomplish this the pilot's control column 106 is operated to swing the pods 15 to positions where the nozzles 29 face downwardly. Upon manipulating the handles 116 to operate the turbo powerplants 30 at full or substantially full power, the afterburners 28 are put into operation so that high static thrust is developed at the vertically positioned pods 15. This high thrust readily overcomes the gross weight of the craft and the vertical takeoff is effected. After ascent the pods 15 are turned to have their longitudinal axis generally parallel with the chords of the wings 11 so that the propulsive thrust produces level or normal flight. During transition to this level or normal flight the handles 116 are operated to gradually reduce the power output and thrust and the delivery of fuel to the afterburners 28 is gradually reduced and may be finally cut off. The trimming nozzle 90 and rudder 14 may be directed as desired by operating the pedals 95 during the takeoff and transition to normal flight to trim the craft. During flight the control column 106 and the inner tube 110 are manipulated or moved to simultaneously and/or individually turn and direct the pods 15. It is contemplated that operation of the turbo jet powerplants 30 driving the ducted compressors 20 and supplying a limited amount of propulsive air under pressure to the nozzle 90 will produce sufficient power and thrust to obtain and maintain aerodynamic sustentation and relatively high speed flight without afterburning. However, afterburning may be resorted to for emergency, special or military maneuvers where sudden bursts of speed are needed. During flight the aircraft is readily maneuvered by directing or swiveling the pods 15. Simultaneous upward or downward movement of the pods 15 results in upward or downward change in direction of flight of the craft. By swiveling one pod 15 upwardly to some extent and the other pod downwardly to the same or a greater or lesser extent, the aircraft is readily turned and/or banked at will. Further, by selective manipulation of the handles 116, one pod 15 may be made to deliver more propulsive thrust than the other and thus effect a turn or assist in changing the direction of flight. The nozzle 90 and the rudder 14 although primarily for the purpose of trimming the airplane, may be employed to assist in the desired maneuvers.

To effect a landing the pods 15 are gradually turned to positions where the nozzles 29 face downwardly or in the general downward direction. This produces a transition from level flight to a steep descent or substantially vertical descent and the pedals 95 may be operated to bring the nozzle 90 and rudder 14 into play to trim the aircraft. With the pads 15 in positions with the nozzles 29 facing downwardly or prior thereto the valves 121 are opened wider to bring the turbo jet powerplants 30 up to high power output and to supply fuel to the afterburners 28 so that maximum or high thrust is obtained. This high thrust may be sufficient to produce hovering or very slow descent of the craft for the actual landing or touch-down.

When taxiing on the field or deck and when operating along a road or highway, the pods 15 are turned to have the nozzles 29 face rearwardly or rearwardly and upwardly so that the jets or blasts from the nozzles 29 and 64 clear the road and adjacent personnel and installations. The reactive thrusts of the jets issuing from the nozzles 29, 64 and 90 propel the vehicle forwardly and directional control may be obtained by the rudder 14 and wheel 13 as directed by the pedals 95 and, if desired, the handles 116 may be operated to provide for differential power output by the engines 30 and/or the pods 15 may be turned individually to assist in steering the vehicle. If it is desired to reverse or back up the vehicle, the pods 15 are turned to positions where the nozzles 29 face upwardly and forwardly so that the reactive jets from the nozzles 29 and 64 retard or stop forward movement and produce the desired rearward movement of the vehicle. In a like manner the pods 15 may be turned in this way to break or control motion of the vehicle when traveling forwardly. The craft has a relatively short span and is designed for convenient operation along the highway with no structural changeover from the normal flight condition.

Having described only a typical form of the invention I do not wish to be limited to the specific details herein set forth, but wish to reserve to myself any variations or modifications that may appear to those skilled in the art and fall within the scope of the following claims.

I claim:

1. In a craft having a fuselage and wings the combination of; pods supported at the tips of the wings for movement about axes extending spanwise of the wings and transversely of the fuselage, the pods having through air ducts extending transversely of said axes, compressors in the ducts for discharging propulsive streams of compressed air therethrough, turbine engines on the pods spaced outboard from their respective ducts for driving the compressors, and pilot operated means for simultaneously and differentially moving said pods about said axes.

2. In an aircraft provided with a fuselage and two wings the combination of; a pod at the tip of each wing, the pods having air ducts extending therethrough, compressors in the ducts, gas turbine engines in the pods, drive means drivingly connecting the engines with the compressors, and shaft means operatively interconnecting the compressors of the two pods.

3. In an aircraft provided with a fuselage and wings the combination of; pods at the wing tips having air ducts extending therethrough, compressors in the ducts, gas turbine engines in the pods, drive means drivingly connecting the engines with the compressors, and shaft means operatively interconnecting the compressors, said drive means including overrunning clutches whereby one engine may drive both compressors when the other engine is shut down.

4. An aircraft having a fuselage and wings characterized by pods pivotally arranged at the tips of the wings, a universally movable propulsive nozzle at the aft end of the fuselage, gas turbine powerplants on the pods, ducted compressors in the pods driven by the powerplants to provide propulsive airstreams, means bleeding compressed air from the ducted compressors to said nozzle for discharge therefrom in the form of a trimming reactive air stream, means for pivoting the pods to change the direction of said airstreams, and means operable to move said nozzle to alter the direction of said trimming air stream.

5. An aircraft having a fuselage and wings characterized by pods pivotally arranged at the tips of the wings, a propulsive nozzle mounted at the aft end of the fuselage for universal movement, gas turbine powerplants on the pods, ducted compressors in the pods driven by the powerplants to provide propulsive airstreams, afterburners compounded with the compressors, means bleeding compressed air from the ducted compressors to said nozzle for discharge therefrom in the form of a reactive control air jet, control means connected with the pods for pivoting the pods to change the direction of said airstreams, and means operatively connected with the nozzle for moving said nozzle to alter the direction of said control air jet.

6. An aircraft having a fuselage and wings characterized by pods pivotally arranged at the tops of the wings, a universally movable propulsive nozzle at the aft end of the fuselage, gas turbine powerplants on the pods, ducted compressors in the pods driven by the powerplants to provide propulsive airstreams, afterburners compounded with the compressors, a fuel system for supplying fuel to the powerplants and afterburners, a manual control for said system operable to simultaneously and differentially vary the delivery of fuel to the powerplants and their related afterburners, means for bleeding compressed air from the ducted compressors to said nozzle for discharge therefrom in the form of a control air jet, a control system connected with the pods operable to change the direction of said airstreams, and means connected with said nozzle operable to move the same to alter the direction of said control jet.

7. A vehicle of the character described comprising a fuselage, a directional propulsive nozzle movably mounted at the aft end of the fuselage, pivotally mounted pods spaced laterally from the fore and aft axis of the fuselage, ducted compressors in the pods, gas turbine powerplants in the pods compounded with the compressors by receiving compressed air therefrom and driving the compressors, duct means carrying air under pressure from the ducted compressors to the nozzle, and a control system including means connected with the nozzle for moving the nozzle, and means connected with the pods for pivoting the pods.

8. A vehicle for the character described comprising a fuselage, wings projecting therefrom, a directional propulsive nozzle movably mounted at the aft end of the fuselage, pivotally mounted pods on the tips of the wings, ducted compressors in the pods, gas turbine powerplants in the pods compounded with the compressors by receiving compressed air therefrom and driving the compressors, afterburners downstream from the compressors, variable area nozzle means discharging compressed air and gases of combustion from the ducted compressors and afterburners, duct means carrying air under pressure from the ducted compressors to the nozzle, and a control system including means connected with the nozzle for moving the nozzle, and means connected with the pods for pivoting the pods.

9. In an aircraft having an airframe provided with regions spaced spanwise from the opposite sides of the fore and aft axis of the airframe the combination of: pods supported outboard of said regions for angular movement about axes which extend laterally and forwardly relative to the fore and aft axis of the airframe, the pods having through air ducts provided with ram inlets and discharge exits, the longitudinal axes of the ducts being substantially normal to said axes of angular movement so as to converge toward a point spaced forwardly of the central spanwise axis of the airframe, compressors in the ducts, propulsive nozzles on the pods for discharging compressed air from said exits in the form of propulsive jets, turbo jet engines in the pods and outside of the ducts driving their respective compressors, and means for angularly moving the pods about said first mentioned axes.

10. In an aircraft having an airframe provided with regions spaced spanwise from the opposite sides of the fore and aft axis of the airframe the combination of: pods supported outboard of said regions for angular movement about axes which extend laterally and forwardly relative to the fore and aft axis of the airframe, the pods having through air ducts provided with ram inlets and discharge exits, the longitudinal axes of the ducts being substantially normal to said axes of angular movement so as to converge toward a point spaced forwardly of the central spanwise axis of the airframe, compressors in the ducts for discharging propulsive streams of compressed air therethrough, turbine engines on the pods at the outboard sides of the ducts driving said compressors, and means for moving the ducts about said first named axes to direct the propulsive streams.

11. In an aircraft having an airframe provided with regions spaced spanwise from the opposite sides of the fore and aft axis of the airframe the combination of: pods supported outboard of said regions for angular movement about axes which extend laterally and forwardly relative to the fore and aft axis of the airframe, the pods having through air ducts provided with ram inlets and discharge exits, the longitudinal axes of the ducts being substantially normal to said axes of angular movement so as to converge toward a point spaced forwardly of the central spanwise axis of the airframe, compressors in the ducts, propulsive nozzles on the pods for discharging compressed air from said exits in the form of propulsive jets, turbo jet engines in the pods and outside of the ducts driving their respective compressors, the engines including propulsive nozzles arranged to discharge propulsive air and gas jets substantially parallel with the first named jets, and means for imparting angular movement to the pods and thereby direct the first and second named propulsive jets.

12. In an aircraft having an airframe with a fore and aft axis and having an extremity region spaced spanwise from said axis, a propulsive means comprising a pod supported on said region for angular movement about an axis extending spanwise relative to the fore and aft axis, a through air duct in the pod extending substantially normal to said axis of angular movement, a bladed compressor rotor in the duct for moving air therethrough, a turbo power plant in the pod driving said rotor and including a propulsive exit nozzle means, a propulsive nozzle for said duct discharging the air therefrom, said nozzle means and nozzle being directed in substantially parallel relation, and means for moving the pod about said axis of angular movement to alter the direction of the nozzle and nozzle means.

13. In an aircraft having an airframe with a fore and aft axis and having an extremity region spaced spanwise from said axis, a propulsive means comprising a pod supported on said region for angular movement about an axis extending spanwise relative to the fore and aft axis, a through air duct in the pod extending substantially normal to said axis of angular movement, a bladed compressor rotor in the duct for moving air therethrough, a turbo power plant in the pod driving said rotor and including a rotor rotating about an axis generally parallel with said axis of angular movement, a propulsive discharge nozzle for said duct, and means for moving the pod about said axis of angular movement to alter the direction of the nozzle.

14. In an aircraft having an airframe with a fore and aft axis and having an extremity region spaced spanwise from said axis, a propulsive means comprising a pod supported on said region for angular movement about an axis extending spanwise relative to the fore and aft axis, a through air duct in the pod extending substantially normal to said axis of angular movement, a bladed compressor rotor in the duct for moving air therethrough, a turbo power plant in the pod driving said rotor and including a rotor rotating about an axis generally parallel with said axis of angular movement and a propulsive discharge nozzle means, a propulsive discharge nozzle for said duct, said nozzle means and nozzle being directed in substantially parallel relation, and means for moving the pod about said axis of angular movement to alter the direction of the nozzle.

15. In an aircraft having an airframe with a fore and aft axis and having an extremity region spaced spanwise from said axis, a propulsive means comprising a pod supported on said region for angular movement about an axis extending spanwise relative to the fore and aft axis, a through air duct in the pod extending substantially normal to said axis of angular movement, a bladed compressor rotor in the duct for moving air therethrough, a turbo power plant in the pod at the outboard side of the duct and including a rotor having an axis of rotation generally parallel with said axis of angular movement and driving said compressor rotor, a propulsive exit nozzle for the duct, and means for moving the pod about said axis of angular movement to alter the direction of the nozzle.

16. In an aircraft having an airframe provided with regions spaced spanwise from the opposite sides of its central fore and aft axis the combination of: pods at said regions having propulsive air ducts extending generally fore and aft therethrough, compressors in the ducts, gas turbine engines in the pods driving their respective compressors, means operatively interconnecting the compressors of said ducts, means supporting the pods for pivotal movement about spanwise axes, and means operable to pivot the pods about said axes to alter the direction of the ducts.

17. A propulsive system for an aircraft having an airframe comprising a through air duct arranged to extend in a generally fore and aft direction so as to have an inboard side and outboard side, a propulsive compressor in the duct rotating about a generally fore and aft axis, and a turbo power plant on the outboard side of the duct driving the compressor and characterized by a rotor rotating about an axis extending generally transversely of the axis of rotation of the compressor.

References Cited in the file of this patent

UNITED STATES PATENTS

| 1,315,586 | Wilson | Sept. 9, 1919 |
| 1,464,209 | Martin | Aug. 7, 1923 |
| 2,086,545 | Fator | July 13, 1937 |
| 2,441,488 | Howell | May 11, 1948 |
| 2,443,250 | Johnson | June 15, 1948 |
| 2,472,839 | Kramer | June 14, 1949 |
| 2,474,359 | Isacco | June 28, 1949 |
| 2,518,697 | Lee | Aug. 15, 1950 |
| 2,604,276 | Huben | July 22, 1952 |
| 2,621,001 | Roman | Dec. 9, 1952 |

FOREIGN PATENTS

| 655,089 | Great Britain | July 11, 1951 |
| 971,767 | France | Aug. 16, 1950 |

OTHER REFERENCES

"Popular Science," issue of April 1949; p. 140.